(12) United States Patent
Proshin et al.

(10) Patent No.: US 10,783,433 B1
(45) Date of Patent: Sep. 22, 2020

(54) METHOD FOR TRAINING AND SELF-ORGANIZATION OF A NEURAL NETWORK

(71) Applicant: Bell Integrator Inc., San Jose, CA (US)

(72) Inventors: Dmitry Ivanovich Proshin, Penza (RU); Andrey Ivanovich Korobitsyn, Saratoga, CA (US)

(73) Assignee: Bell Integrator Inc., San Jose, CA (US)

( * ) Notice: Subject to any disclaimer, the term of this patent is extended or adjusted under 35 U.S.C. 154(b) by 0 days.

(21) Appl. No.: 16/390,710

(22) Filed: Apr. 22, 2019

(51) Int. Cl.
*G06N 3/08* (2006.01)
*G06N 20/00* (2019.01)

(52) U.S. Cl.
CPC ............ *G06N 3/08* (2013.01); *G06N 20/00* (2019.01)

(58) Field of Classification Search
CPC .................................. G06N 3/08; G06N 20/00
See application file for complete search history.

(56) References Cited

U.S. PATENT DOCUMENTS

| | | | | |
|---|---|---|---|---|
| 6,513,023 | B1* | 1/2003 | Duong | G06N 3/08 706/26 |
| 2016/0253798 | A1* | 9/2016 | Barrett | G16H 50/20 348/77 |
| 2018/0239992 | A1* | 8/2018 | Chalfin | G06K 9/66 |
| 2019/0164132 | A1* | 5/2019 | Borje | G06Q 10/1053 |
| 2019/0222943 | A1* | 7/2019 | Andersen | H04R 25/507 |

OTHER PUBLICATIONS

Ognjanovski, "Everything You Need to Know about Neural Networks and Backpropagation—Machine Learning Made Easy and Fun" (URL in OA) (2019). (Year: 2019).*
Salome et al., "An Algorithm for Self-Structuring Neural Net Classifiers," in 3 Proceedings of 1994 IEEE Intl. Conf. on Neural Networks 1307-1312 (1994). (Year: 1994).*
Yang et al., "An Evolutionary Constructive and Pruning Algorithm for Artificial Neural Networks and its Prediction Applications," in 86 Neurocomputing 140-149 (2012). (Year: 2012).*

(Continued)

*Primary Examiner* — Kamran Afshar
*Assistant Examiner* — Ryan C Vaughn
(74) *Attorney, Agent, or Firm* — Bardmesser Law Group

(57) ABSTRACT

Method of training a neural network, including receiving sets of digital attributes representing multidimensional regression at inputs; expanding the network by adding neurons and defining their activation functions and interconnections; any neuron of the neural network is capable of being directly connected to any other neuron; (i) when a training speed falls below predefined threshold, and accuracy does not improve, identifying a neuron with highest error value; (ii) adding a neuron directly between the identified neuron and a corresponding output; (iii) setting only a connection coefficient between the added neuron and the identified neuron to zero before it is modified by the training, while other coefficients of the added neuron are set the same as coefficients of the identified neuron, before they are modified. After at least one iteration, either (iv) finishing the training of the neural network or (v) continuing to train the network to reach a predefined depth.

12 Claims, 8 Drawing Sheets

(56) References Cited

OTHER PUBLICATIONS

Huang et al., "A Generalized Growing and Pruning RBF (GGAP-RBF) Neural Network for Function Approximation," in 16.1 IEEE Trans. Neural Networks 57-67 (2005). (Year: 2005).*

Kindermann et al., "A Comparison of Different Neural Methods for Solving Iterative Roots," in Proc. Seventh Intl. Conf. Neural Info. Processing 565-569 (2000). (Year: 2000).*

Dora et al., "Development of a Self-Regulating Evolving Spiking Neural Network for Classification Problem," in 171 Neurocomputing 1216-1229 (2016). (Year: 2016).*

Vukovic et al., "A Growing and Pruning Sequential Learning Algorithm of Hyper Basis Function Neural Network for Function Approximation," in 46 Neural Networks 210-226 (2013). (Year: 2013).*

Ren et al., "An Optimal Neural Network and Concrete Strength Modeling," in 33 Advances in Engineering Software 117-30 (2002). (Year: 2002).*

Gately, "Cycles: A Simulation Tool for Studying Cyclic Neural Networks," in Neural Info. Processing Sys. 290-96 (1988). (Year: 1988).*

Caliskan et al., "Performance Improvement of Deep Neural Network Classifiers by a Simple Training Strategy," in 67 Engineering Applications of Artificial Intelligence 14-23 (2018). (Year: 2018).*

\* cited by examiner

METHOD FOR TRAINING AND SELF-ORGANIZATION OF A NEURAL NETWORK

BACKGROUND OF THE INVENTION

Field of the Invention

The present invention relates to computers and can be used to synthesize neural networks that classify objects in datasets and objects defined by sets of figures (vectors), particularly objects involving network training, image recognition, mathematical modeling, forecasting, management and optimization of various processes and objects, stock market forecasting, and credit risk assessment.

Description of the Related Art

Several types of artificial neural networks are known, including networks where each neuron sends its output signal both to other neurons' inputs and its own input [1-4], such networks being called "recursive feedback systems".

There is a self-extending system of neural networks according to the U.S. Pat. No. 5,033,006 entitled "Self-extending neural-network", which is capable of classifying input datasets of various formats, including audio data and visual data. This neural network comprises intermediary nodes that compare input datasets with templates that have been already learned. These templates are implemented as weights, wherein each element in an input dataset is given its individual weight. Each template has an associated class; also, several templates may be associated with a single class. The intermediary nodes generate an output that reflects the comparison of input data with a selected template. The output is passed on to output nodes of the corresponding class, each class having its own unique output node. The output node selects one of the templates that send their output to this node, preferably, one that is most similar to the input data. Each output node passes on the node number and value pointing at the similarity with the template, to a selector that selects one of the templates as a preferred one, particularly selecting the class associated with the template as the input class. In a preferred embodiment, the template that is most similar to the input data is selected, and the class associated with this template becomes the selected class. In addition, this conventional method also provides assessment as to whether the input signal class has been selected properly. This method allows the system to learn new templates, modify the existing ones, and assess classification stability as well. A large extent of similarities between templates belonging to different classes causes classification to be unstable. In order to eliminate this issue, the system according to this patent determines whether the selected class contains a template that is too similar to the template of the correct class. If there are any, the system modifies them so that they could be distinguished to ensure stable classification.

In case the classification is incorrect, the system determines whether there is a template of the correct class. If there is none, a new class template is created. Then, if an incorrect class has been selected, the system determines whether this incorrect class is too similar to the correct class, after which the template of the selected (incorrect) class is further modified so that it is better distinguished from the template of the correct class to ensure proper classification.

The main drawback of this method for training and self-organization of neural networks consists of enormous datasets and amounts of processed information in training, which causes an overly data-heavy resulting model, as well as significant amounts of time spent on training and operation, thus limiting its implementation and use in mobile systems.

U.S. Pat. No. 6,269,351, entitled "Method and system of training of an artificial neural network", teaches a method and system for training an artificial neural network (ANN). According to one preferred embodiment therein, an ANN is initialized by assigning values to one or several weights. The adaptive training speed is set to an initial value; input-level and output-level training templates are stored. Input-level training templates are processed by the ANN to obtain output templates. The error between the output-level template and output template is calculated and then is used to calculate an error coefficient, which will be used to adjust the adaptive training speed. If the error coefficient falls below a threshold value, the adaptive training speed may be increased through multiplication by an increment factor. Otherwise, if the error coefficient exceeds a threshold value, the adaptive training speed may be decreased through multiplication by a decrement factor. Weight values that are used for ANN initialization are adjusted based on the calculated error and adaptive training speed. This method for training is repeated until the ANN achieves its final trained state.

The main drawback of this method for training and self-organization of neural networks is that the resulting model has a sub-optimal structure with an inflated number of trained neurons, whereas parameter information of the object or process is evenly distributed among multiple elements in the neural network without and is not structured at all.

U.S. Pat. No. 9,424,514, entitled "Synapse maintenance in the developmental networks", discloses a developmental neural network being trained using a synaptic maintenance process. Synaptogenic trimming is first performed on the neuron inputs using a synaptogenic factor for each neuron based on standard deviation of a measured match between the input and synaptic weight value. A top-k competition among all neurons then selects a subset of the neurons as winning neurons. Neuronal learning is applied only to these winning neurons, updating their synaptic weights and updating their synaptogenic factors.

The drawbacks of this method for processing information in neural networks include the need for extra adjustments of weights in the subset of winning neurons and the fact that all information is concentrated in these neurons, which results in a neural network that stores information in an unstructured way, concentrated in the subset, thus diminishing classification capabilities for similar objects, increasing the probability of the system converging to a local minimum during training, and reducing its resilience.

U.S. Pat. No. 9,449,270, entitled "Implementing structural plasticity in an artificial nervous system", discloses a method and apparatus for implementing structural plasticity in an artificial nervous system (ANN). The method consists in altering a structure of an artificial nervous system by determining a synapse in the artificial nervous system for reassignment, determining a first artificial neuron and a second artificial neuron for connecting via the synapse, and reassigning the synapse to connect the first artificial neuron with the second artificial neuron, wherein determining the first and second artificial neurons is based at least in part on a relative spike timing between the first and second artificial neurons and on spike-timing-dependent plasticity (STDP) model, wherein a search window for determining the relative spike timing corresponds to an STDP window, where STDP is a learning process that adjusts the strength of synaptic connections between neurons.

Determining the first and second artificial neurons involves accumulating energy of the first artificial neuron over the search window, applying a delay to an STDP function, convolving the accumulated energy and the delayed STDP function, and reassigning the synapse to connect the first artificial neuron with the second artificial neuron.

Determining the synapse includes randomly or pseudo-randomly determining the synapse for reassignment. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time Tpr of the pre-synaptic neuron and spike time Tps of the post-synaptic neuron (i.e., T=Tpr−Tps). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

For certain aspects, determining the synapse for reassignment includes determining that a weight associated with the synapse is 0 or near 0, or that a weight associated with the synapse is below a threshold. The method also entails determining that a difference between a first spike time of a post-synaptic artificial neuron connected with the synapse (e.g., a post-synaptic spike time) and a second spike time input to the synapse (e.g., an input spike time) is above a threshold. Determining the first and second artificial neurons includes selecting two artificial neurons whose future relative spike timing is likely to potentiate.

The main drawback of this method of operation of a neural network is in its tendency to over-train and in a virtually even distribution of all features of a model across all synaptic connections, thus making network training more difficult.

All conventional methods mentioned above are lacking hierarchical organization in the resulting model, which makes them prone to over-training, and causes a high probability of converging to a sub-optimal local minimum during training

SUMMARY OF THE INVENTION

Therefore, an object of the present invention is to improve performance, reduce the training and operation time, simplify the neural network construction procedure by automatically generating its structure while creating a common part of the network that forms the information synthesizing hierarchy, as well as to reduce the risk of finding (converging to) a best local minima during the training, and to increase resistance to over-training, thus eliminating the disadvantages of the conventional art.

In accordance with exemplary embodiments of the claimed method for creating a multi-factor model and classification, the neural networks generated have significantly fewer neurons while being more accurate and resistant to over-training, and being able to train using smaller training sets.

Additional features and advantages of the claimed solution are described in the following disclosure, as well as proved by the actual practice of the invention. These advantages and improvements can be achieved by neural networks that have been constructed and trained in accordance with the claimed method, specifically, following the disclosure, along with the accompanying claims and drawings.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
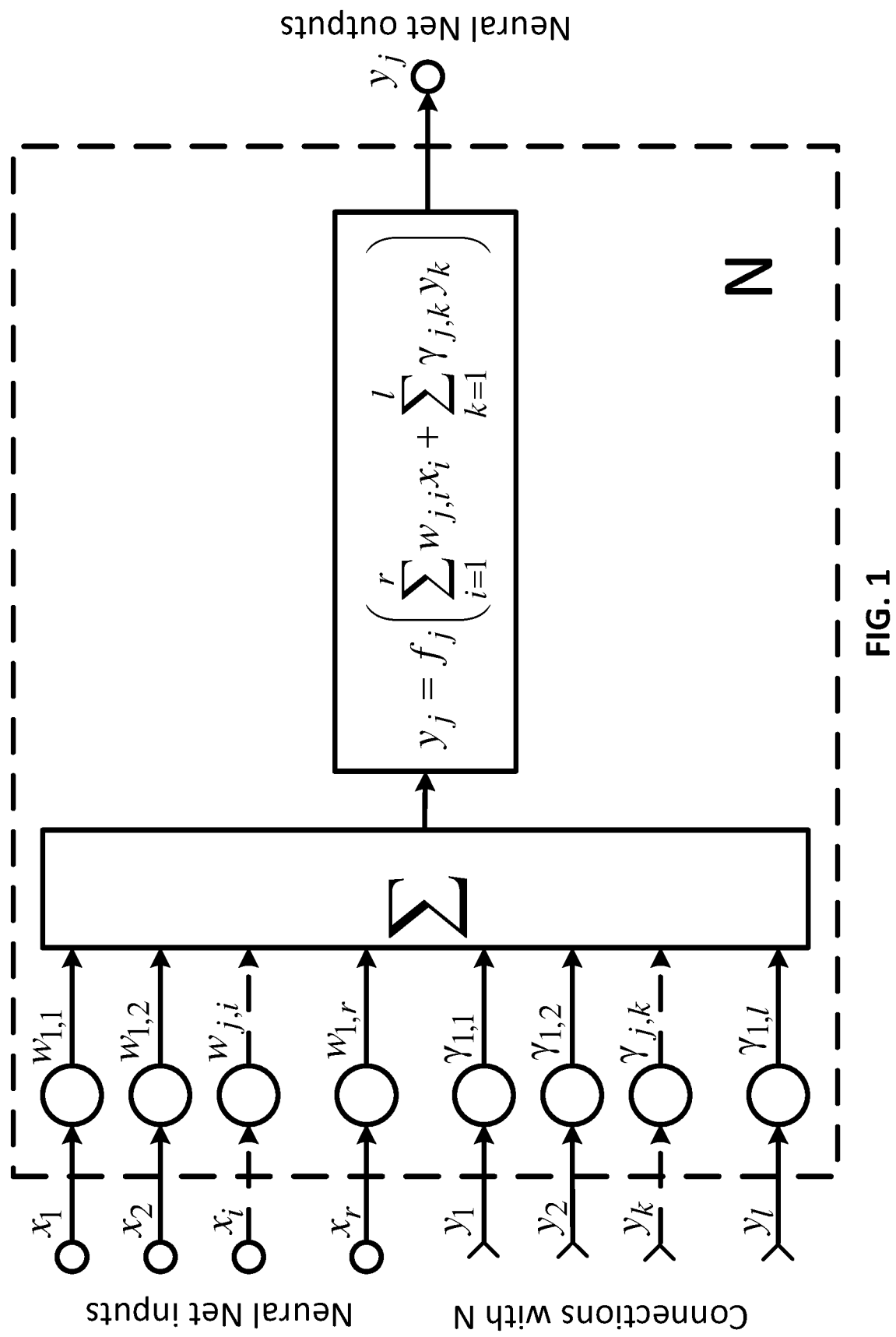
FIG. 1 shows the structure of a neuron (N) in a neural network (NN).

Reference will now be made in detail to the embodiments of the present invention, examples of which are illustrated in the accompanying drawings.

The following designations are used in the discussion below:
p—number of parameters;
d—training depth;
n—number of parameters calculated in parallel;
$\Delta_q$—parameter change discreteness in the current iteration;
Interval—parameter change interval;
m—number of points within an interval;
q—current iteration number;
M—number of iterations;
ε—pre-set error margin;
r—number of neural network inputs;
L—number of neural network outputs that are connected to neuron inputs;
n—number of neurons of the neural network;
$S_j$—weighted sum of the inputs of the $j^{th}$ neuron;
OUTS—number of neural network outputs;
N—number of examples used to train the neural network;
i, j, k—current numbers of the variables;
$\gamma_{j,k}$—weight at the kth input of the jth neuron that is connected to neuron outputs of the jth neuron in the neural network;
$w_{j,i}$—weight at the ith input of the jth neuron that is connected to the neural network;
$c_j$—coefficient of the activation function of the jth neuron;
$x_i, y_j$—signals at the ith input and jth output of a neuron;
$xI_i, yO_j$—signals at the ith input and jth output of the neural network;
$ys_{j,k}, yO_{j,k}$—template "training" signal that is calculated by the neural network for jth output of the neural network for the kth example;
f(*)—functional dependency type;
O—optimization criterion.
e—Euler's number (natural logarithm base);
log(*)—logarithm function.

The objective therefore is to reduce the size of the training set and reduce the number of neurons in the neural network, to improve performance, to reduce the training and operation time, to simplify the neural network construction procedure by automatically generating its structure while creating a common part of the network that forms the information synthesizing hierarchy, as well as to lower the risk of finding (converging to) a sub-optimal local minimum during the training, and to increase resistance to over-training.

The proposed method of training and self-organization of a neural network includes network training and self-organization performed simultaneously using a minimal required number of neurons for the given task at the given accuracy of the model, creating a common part of the network and forming hierarchical connections between the neurons. Adjustable parameters include weights of neurons and activation function parameters. The training is performed using a GPU-adapted algorithm involving iterative parallel computation of neural network discrepancies in the points (with specified discreteness) of a parameter space, wherein the search interval is reduced by up to two times the value of pre-set discretization with each iteration. When parameters of neurons participating in the training are calculated, the inner states of their outputs are calculated in advance to be used multiple times during the training.

The weight coefficients of the neurons and the activation function parameters are adjustable parameters, and the training is based on a GPU-adapted method (see U.S. patent application Ser. No. 16/266,480, filed on Feb. 4, 2019, incorporated herein by reference in its entirety), involving iterative parallel calculation of neural network differences at specific points, with specific discreteness, of a p-dimensional space containing parameters to be searched for, and where, with each iteration, the search interval is reduced by up to two times the value of discretization that has been determined in the previous iteration.

The entire training set is divided into parts. If the initial set is too large, then a training set (i.e., a set that is sufficient for training) and a testing set (generally, several testing sets, which may include the training set) are generated from it. Then, the model is trained using the training set, and at each iteration, after the η model parameters from the group of parameters n to be computed in parallel have been found, the model is tested using the testing set.

If the accuracy of the model in the current iteration has improved, the found neuron parameters are stored, and the training is continued with the next parameter group η.

If the accuracy of the model, that is evaluated during the current iteration based on the testing set, has not improved, the model parameter values are left as they were in the previous iteration, and the training is continued with a newly formed group of η parameters.

Based on the capabilities of the hardware in use, a group of η parameters that have to be simultaneously calculated at m points for each parameter is randomly generated from the entire set of variable parameters p, and the group of η parameters to be found is calculated in parallel at points with specific discreteness.

When parameters (i.e., weighting coefficients and neuron activation function parameters) of the neurons from the training list are calculated, first, inner neuron output states are calculated to be used repeatedly during training.

New neurons are added to the training circuit between the output of the neuron with the highest error value and the network output, assuming that the accuracy of the model (which is assessed at the current iteration based on the testing set, for all groups of model parameters), does not improve, and the network training speed falls below a predefined threshold.

In accordance with the claimed method, in each qth training step, the difference function in the p parameter space (including weighting coefficients of neurons and activation function parameters) is calculated in parallel with the predefined discreteness $\Delta_q$. Then, parameter values are selected, for which the discrepancy (difference) function is at a minimum. The search interval for each parameter in each iteration is reduced by up to two times the predefined discretization value $2\Delta_q$, the discreteness $\Delta_q$ is divided by (m−1), so that $\Delta_{q+1} = \Delta_q/(m-1)$, and the process above is repeated, until a predefined accuracy value is achieved, or a specific number of steps has been performed.

The discreteness $\Delta_q$ of each parameter change in the qth iteration (q∈[1,r]), with m points per interval (interval), is determined using the following formula:

$$\Delta_q = \frac{2^{q-1} \text{interval}}{(m-1)^q}, q \in [1, r]. \quad (1)$$

The number M of iterations required to calculate the parameters of the model with the given error margin is determined using formula (1), where the discreteness $\Delta_q$ parameter change in the target iteration M is set equal to to the predefined error margin Σ: ΔN=ε. Therefore, as follows from (1), M would be:

$$M = \frac{\log\left(\frac{\text{interval}}{2\varepsilon}\right)}{\log(m-1) - \log(2)}. \qquad (2)$$

The proposed method of training may be implemented using a graphics card that is capable of performing up to 65535*1024=67107840 parallel computations. Hence, assuming for purposes of example that the number of parameters to be searched for simultaneously is six (referred to as "a 6-parameter tuple"), the resulting resolution capability for a 6-dimensional parameter space would be:

$$m = \sqrt[6]{67107840} = 20.159.$$

Therefore, the graphics card's specifications allow to compute the discrepancy value in 20 points within an interval for each of the six parameters. In practice, however, five points per dimension are usually enough to find a neural network coefficient, whereas the specific number of GPU cores and threads in them should be determined depending on the GPU in use, based on the actual number of cores and threads in each core that are required to achieve maximum processing speed. If there is an insufficient number of cores and threads in the GPU, then the search has to be performed in stages, where the entire space to be searched is divided into parts, and the computation results are combined. The required parameter computation accuracy (1) is achieved by repeating the procedure as described above. At a given parameter computation accuracy, the required number of iterations can be calculated using formula (2). At ε=0.001 and the relative interval of 1, the required number of iterations for the given example would be:

$$M = \frac{\log\left(\frac{\text{interval}}{2\varepsilon}\right)}{\log(m-1) - \log(2)} =$$

$$-\frac{\log(.002)}{\log(19) - \log(2)} = -\frac{\log(.001) + \log(2)}{1.28 - 0.3} = \frac{3 - 0.3}{0.98} = 2.76.$$

If the number of parameters to be identified exceeds the optimum number η determined by the available equipment (in the test embodiment, η=6), it may be preferable that the search be conducted in several stages.

In order to identify more than 6 parameters using the proposed method, it is preferable that the search be conducted in several stages:

1. Randomly generating a list of tuples, each containing η parameters from the parameter p search list;
2. For each tuple in the list, refining parameters in turn as described above;
3. Checking the discrepancy change (a maximum for all discrepancy parameters). If the discrepancy change value exceeds a predefined threshold, then proceed to the first stage. If, in the given iteration, the total error value doesn't change at all, or the change value is less that a predefined threshold (referred to as a "stationary state"), then the search is finished.

Each neuron output in a fully-connected recursive neural network $y_j$, $j \in [1,n]$) is characterized by an output function of a weighted sum of input impacts $x_i$($i \in [1,r]$) with weights $w_{j,i}$ and outputs $y_k$($k \in [1,L]$) with weights $\gamma_{j,k}$ $$y_j = f_j\left(\sum_{i=1}^{r} w_{j,i} x_i + \sum_{k=1}^{L} \gamma_{j,k} y_k\right).$$

In a first iteration, a neural network made up of a single neuron is created, with the following output signal:

$$y_1 = f_1\left(\sum_{i=1}^{r} w_{1,i} x_i\right).$$

When a second neuron is connected in series, its output signal would be:

$$y_2 = f_2\left(\sum_{i=1}^{r} w_{2,i} x_i + \gamma_{2,1} y_1\right)$$

or $$y_2 = f_2\left(\sum_{i=1}^{r} w_{2,i} x_i + \gamma_{2,1} f_1\left(\sum_{i=1}^{r} w_{1,i} x_i\right)\right).$$

The third neuron connected to the second neuron's output would generate its output signal as follows:

$$y_3 = f_3\left(\sum_{i=1}^{r} w_{3,i} x_i + \gamma_{3,2} f_2\left(\sum_{i=1}^{r} w_{2,i} x_i + \gamma_{2,1} f_1\left(\sum_{i=1}^{r} w_{1,i} x_i\right)\right)\right).$$

When the outputs of each neuron in the network, except for the one that is being added, are connected to the input of the neuron that is being added, its output signal would be:

$$y_j = f_j\left(\sum_{i=1}^{r} w_{j,i} x_i + \sum_{\substack{k=1 \\ k \neq j}}^{L} \gamma_{j,k} y_k\right).$$

The proposed method for training and self-organization of a neural network includes the following steps:

1. Dividing the entire set of adjustable parameters p (the weighting coefficients of neurons and the activation function parameters) into several groups of n parameters for each factor, that have to be simultaneously calculated in m points, based on the capabilities of the equipment in use.
2. Randomly generating a training set (i.e., a set that is sufficient for training) and a testing set (generally, several testing sets) that are used to test the model at each iteration, after its parameters from the η group have been found. Forming a control sample for monitoring the training of a neural network that does not include training and test sets.
3. Setting the initial training depth, which determines the number of neurons to be included into the training circuit.
4. Adding as many neurons as there are network outputs, and assigning one output to each neuron. Each neuron is stored in a separate connection list, where there is one such list for each network output.
5. Using the given set of examples to train the resulting neural network and training the model using a test set at each iteration, after the model parameters from the group n have been found. Once per cycle, when calculating the output states of the neural network, some state vectors of neurons that are connected to network inputs are calculated in advance, and the calculation results are used regularly to calculate network states. Weighting coefficients of the neural network and activation function parameters are determined using a GPU-adapted algorithm involving iterative parallel calculation of neural network discrepancies in the points, with specific discreteness, of a p-dimensional space, where p is the number of parameters to be found, and wherein, with each iteration, the search interval is reduced by up to two times the predefined value of discretizaition.

6. If the accuracy of the model, which is evaluated at the current iteration based on the testing set, improves, storing the found neuron parameters, and continuing the training with the next parameter group η.

7. If the accuracy of the model, that is evaluated at the current iteration based on the testing set, does not improve, leaving the model parameter values as they were in the previous iteration, and continuing the training with a newly formed group of η parameters. As a result, connections between network inputs and neurons, as well as connections between neurons, are set up. Activation function parameters of neurons are determined.

8. If the accuracy of the model for all model parameter groups, that is assessed at the current iteration based on the testing set, does not improve, and the network training speed falls below a predefined threshold, determining the neuron having the highest discrepancy (error) value. Between the found error neuron and the network output, another neuron is added, and the network output is re-assigned to the added neuron. This neuron is added to the end of the list of connections between the neurons and the network output.

9. Setting the weighting coefficient of the connection between the error neuron and the added neuron to zero, and setting the weighting coefficients of connections between the added neuron and other neurons to the same values as the weighting coefficients of the neuron that was found in step 8.

10. Adding a list of all weights and activation function parameters associated with the added neuron into the training circuit, excluding the coefficients of connections between network output neurons and network outputs.

11. Continuing to train the neural network using the algorithm as described above. Weighting coefficients are adjusted, starting with the weight of connection between the neuron that was found in step 8 with the added neuron, and up to the specified depth, counting from the end of the list.

12. Adding all neuron weights and activation function parameters from the connection list up to the depth specified in step 3, counting from the end of the list. If the list is shorter than the specified depth, no extra parameters are added.

13. Training the resulting neural network using the specified training set, and then testing it using the testing set. Monitoring the neural network learning process on the control sample.

14. Repeating all steps starting from step 5, until the required accuracy of the neural network is attained. The training is finished if, at any given iteration, the number of iterations or the model accuracy (as assessed using the testing set) exceeds predefined threshold values.

In accordance with the proposed method, search ranges of its optimum coefficients are set depending on the selected activation function.

For instance, for the sigmoid of the jth neuron, $$f_j(S_j) = \frac{1}{1 + e^{-c_j \cdot S_j}}$$

the highest-variability behavior can be achieved by changing c within the range of 1 to 20. Here, $S_j$—weighted sum of the input signals of the jth neuron;
i, j—current numbers of the variables;
$c_j$—activation function coefficient of the jth neuron;
e—Euler's number (natural logarithm base).

It is preferable to use the sum of squared deviations of values, which are generated at network outputs $yO_{j,k}$, and template values $ys_{j,k}$ that are set during training stages, as the criteria of optimization search of model parameters for the regression task:

$$O = \sum_{k=0}^{N} \sum_{j=0}^{OUTS} (yO_{j,k} - ys_{j,k})^2,$$

while for classification and identification tasks it is preferable to calculate the cross-entropy values:

$$O = \sum_{k=0}^{N} \sum_{j=0}^{OUTS} (ys_{j,k} \cdot \log(yO_{j,k}) + (1 - ys_{j,k}) \cdot \log(1 - yO_{j,k})).$$

Here, N—the number of examples used to train the neural network;
OUTS—the number of neural network outputs;
j, k—current numbers of the variables;
$ys_{j,k}$, $yO_{j,k}$—template "training" signal that is calculated by the neural network for the jth output of the neural network for the kth example;
log(*)—logarithm function;
O—optimization criterion.

By dividing the entire set of adjustable parameters p, based on the capabilities of the hardware in use, into several groups of η parameters that have to be simultaneously calculated at m points, and by training the neural network to the given depth, it is possible to increase processing speed of the neural network and utilize the hardware to its fullest capacity.

The training set can be formed at each iteration randomly from an existing data set. The size of the training can also change from iteration to iteration. The test set should be sufficient for evaluating the quality of the results of the neural network. The control set is typically formed from a separate data set that is neither the training nor a testing set.

By generating a training set (i.e. a set that is sufficient for training) and a testing set (generally, several testing sets, which may include the training set) from the entire set of examples, and using the sets to test the resulting model at each iteration after its parameters from the group η have been found, it is possible to keep the selected training direction towards a global minimum (or maximum), reduce the risk of over-training the network, and to determine optimum parameters for the network. The use of a control sample that does not include the training and test sets improves the accuracy of training of the neural network.

By making a single calculation of some vector states of the neurons connected to the inputs, and repeatedly using the results of calculating network states, it is possible to reduce the number of calculations and increase the processing speed.

In accordance with the algorithm described above, a minimal-structure neural network is gradually constructed and subsequently trained. By locating output neurons with the highest discrepancy (error) and subsequent correction of the model through connection of an additional neuron to the error neuron output, it is possible to increase the model's accuracy while keeping the training history in the coefficients (weights) of the neurons that are not included into the training circuit. This approach allows training of the neural network in a hierarchical fashion, starting with a rough approximation of the model, and subsequently refining it through adjustment of the weights of the neurons that are included into the training circuit at each iteration, in compliance with the specified training depth.

As a result, a hierarchical structure model is constructed that contains a minimal number of neurons and roughly represents the object being modeled (the representation itself is stored in the weights of neurons selected at the initial training stages), while also describing the features of the object (the features are stored in the parameters of neurons adjusted during the following training stages). By constructing a neural network using the claimed method, it is possible to create a minimal-structure, highly accurate model with minimal controlled over-training. Also, thanks to parallel information processing and additional pre-calculations, the method has high performance.

To manage network retraining, a standard cross-validation approach is recommended, where the training should be stopped as soon as the pre-set level of quality has been achieved using a validation set.

Below, the specific aspects of the claimed method for training and self-organization of a neural network are disclosed for the example of creating a multi-factor functional dependency. In the structure of a neuron (N), there are inputs with weights $w_{j,i}$ (where j is the neuron number, and i is the neuron (network) input number), that are connected to the network inputs and outputs with weights $\gamma_{j,k}$ (where k is the number of the neuron input that is connected to the outputs of other neurons), that are connected to other neurons' outputs (see FIG. 1).

Figure 2:
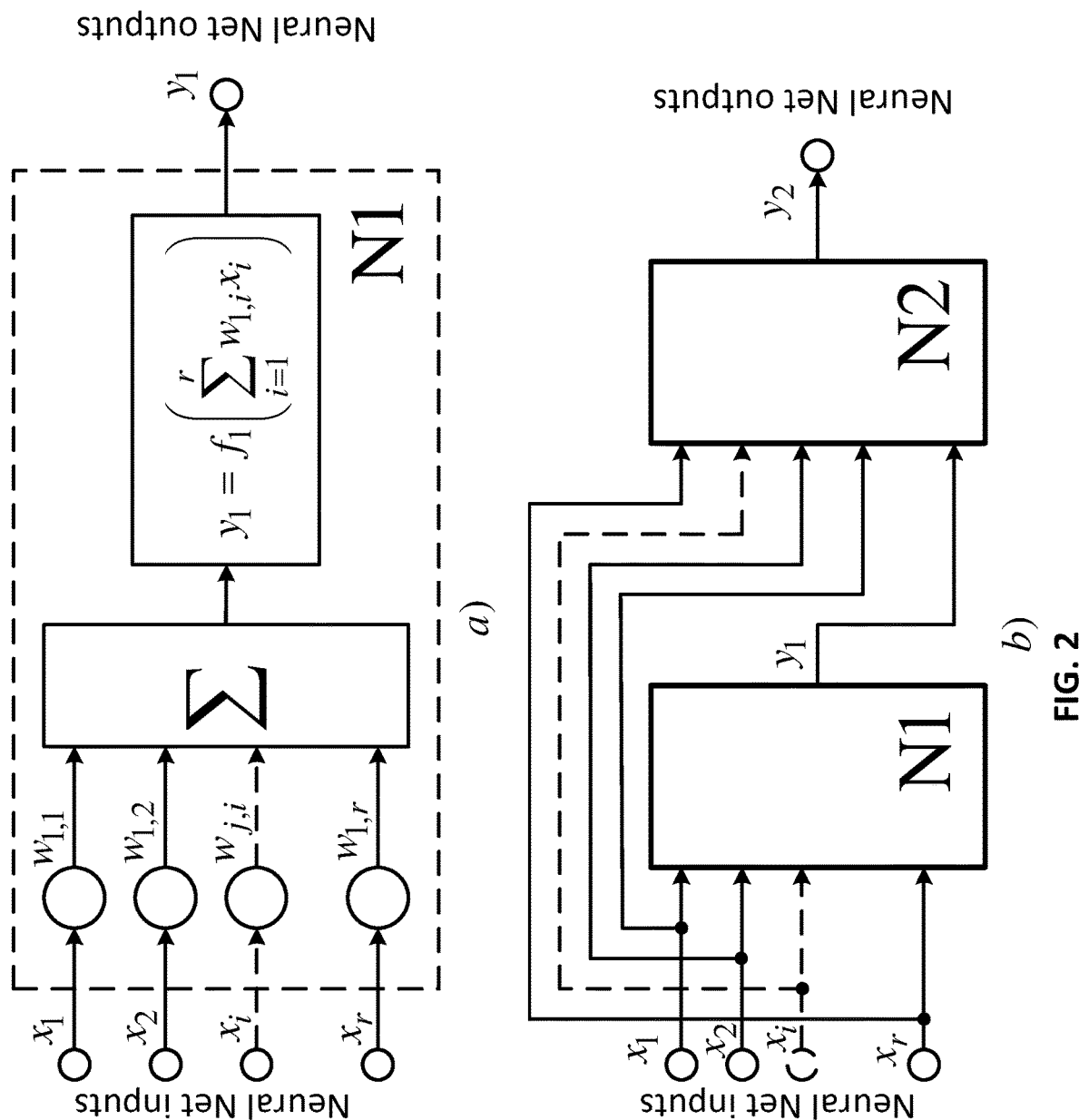
FIG. 2 shows the structure of a neural network during construction of a multi-factor functional dependency in the first (a) and second (b) training stages.

At the first stage, one neuron is selected; its output is connected to the neural network output, and its inputs are connected to the network inputs (see FIG. 2, part a). Then, the initial training depth d is set that determines the number of neurons to be included into the training circuit. Adjustable parameters include neuron weights and activation function parameters. The training is carried out using a GPU-adapted algorithm comprising iterative parallel calculation of the neural network discrepancy in points (with a specified discreteness) within the parameter search space.

The entire variation range of weights (−1 to +1) and activation function parameters (1 to 20, for example, if a sigmoid activation function has been selected) is divided into m−1 intervals with the discreteness of 2/(m−1), where m is the number of points in the interval from each of the parameters that are sought (in the experiment, the length is 6). With each iteration, the search interval is reduced by up to two values of the given value of the discretization near the point of the minimum. When the network training speed falls below a pre-set threshold, the model accuracy level is evaluated.

If the model is accurate enough, the training is finished. Otherwise, a second neuron is connected to the network output, with its weights of connections to the network inputs set to the same values as those of the first neuron (see FIG. 2, part b). The newly added neuron is initiated as some sort of a "clone" of the previous neuron from the list of neurons connected to the specified output.

In the next cycle, the training follows the same procedure, where the weighting coefficients and activation function parameters for the second neuron, and then for the first neuron, are repeatedly adjusted until the network discrepancy is neutralized. When the second neuron is being trained, each η-parameter tuple has to include $\gamma_{2,1}$ and the $c_2$ activation function coefficient of the newly added neuron as required parameters, e.g.: $\{\gamma_{2,1}, c_2, w_{2,1}, w_{2,5}, w_{2,9}, w_{2,2}\}$ $\{y_{2,1}, c_2, w_{2,13}, w_{2,4}, w_{2,7}, w_{2,8}\}$ . . . . If the training depth is two or more, then both neurons are adjusted in sequence; otherwise, only the second neuron parameters are adjusted. Also, when the neurons following the newly added neuron are trained, the training tuple has to include the activation function parameters for the neuron that is being trained as required parameters, e.g. $\{c_1, w_{1,2}, w_{1,1}, w_{1,5}, w_{1,9}, w_{1,2}\}$ $\{c_1, w_{1,3}, w_{1,4}, w_{1,6}, w_{1,7}, w_{1,8}\}$ . . . , which significantly reduces the number of iterations needed to stabilize the network.

At each moment in the process of training, only one neuron's parameters are affected, thus, in order to speed up the computations, it is preferable to pre-calculate (once) the output values of all neurons preceding the one that is currently being trained, and to pre-calculate the sum of the products of neuron input and output signals multiplied by the corresponding coefficients of the neuron that is currently being trained (excluding those coefficients that are being adjusted) as well. Additionally, in order to speed up the process, it is preferable to pre-calculate the accumulated discrepancy at the inputs preceding the neuron that is currently being trained.

Figure 3:
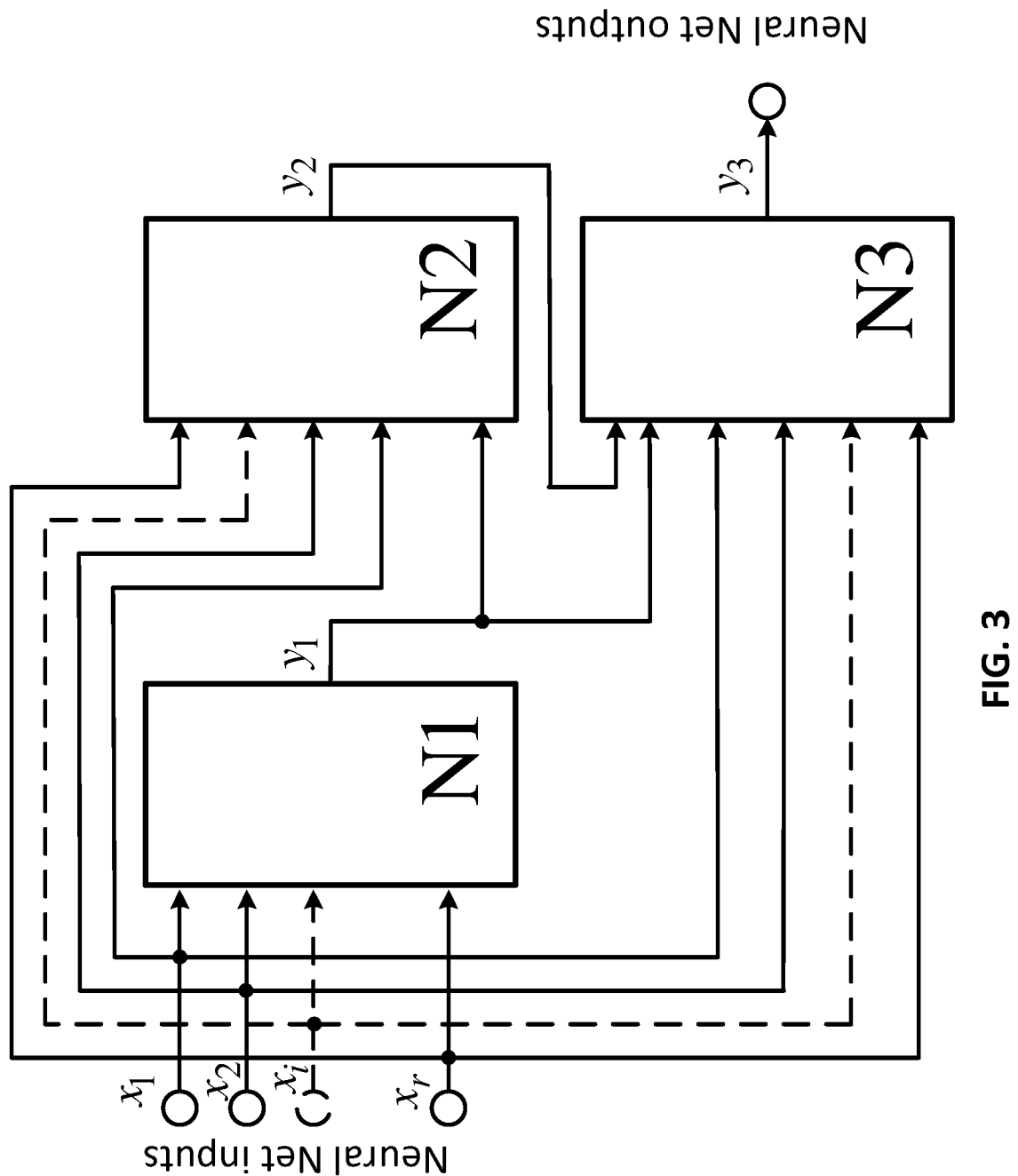
FIG. 3 shows the structure of a neural network during construction of a multi-factor functional dependency in the third training stage.

If, at this stage, the model is not accurate enough, a third neuron is added between the second neuron's output and the network output, with its connection weight set to 0, and its weights of connections to the inputs of the first neuron and the network itself set to the same values as those of the second neuron (see FIG. 3).

In the next cycle, the training follows the same procedure, where the weights and activation function parameters of the second and third neurons are adjusted based on the pre-set training depth (e.g., two). If the training depth is set to three, for example, then the first neuron will also participate in the training (the training sequence will be as follows: 3-2-1; 3-2-1; . . . until network discrepancy is neutralized).

The training and neural network structure forming procedure follows the same algorithm until the model has achieved the pre-set accuracy level, or the given amount of time has expired.

The hierarchical structure model can be formed by gradually expanding the neural network, increasing the number of neurons in it, and adjusting the parameters only of a limited number of neurons, depending on the training depth d. Neuron parameters, defined at the initial steps, provide a first-level structural and parametrical identification of the model that allow to obtain a rough estimate of the studied object. Further training stages allow to refine neuron structures and parameters through addition and adjustment of only the d latest neurons that contain progressively more detailed information about the object.

Such a training method, based on a GPU-adapted algorithm, allows reducing the risk of over-training and converging to an optimal local minima while adjusting the neural network parameters. When calculating the output states of the neural network, some state vectors of neurons, which are connected to the inputs, are pre-calculated once per cycle. The results are then used repeatedly to calculate network states, which allows reducing the amount of computations and to speed up the training process.

Figure 4:
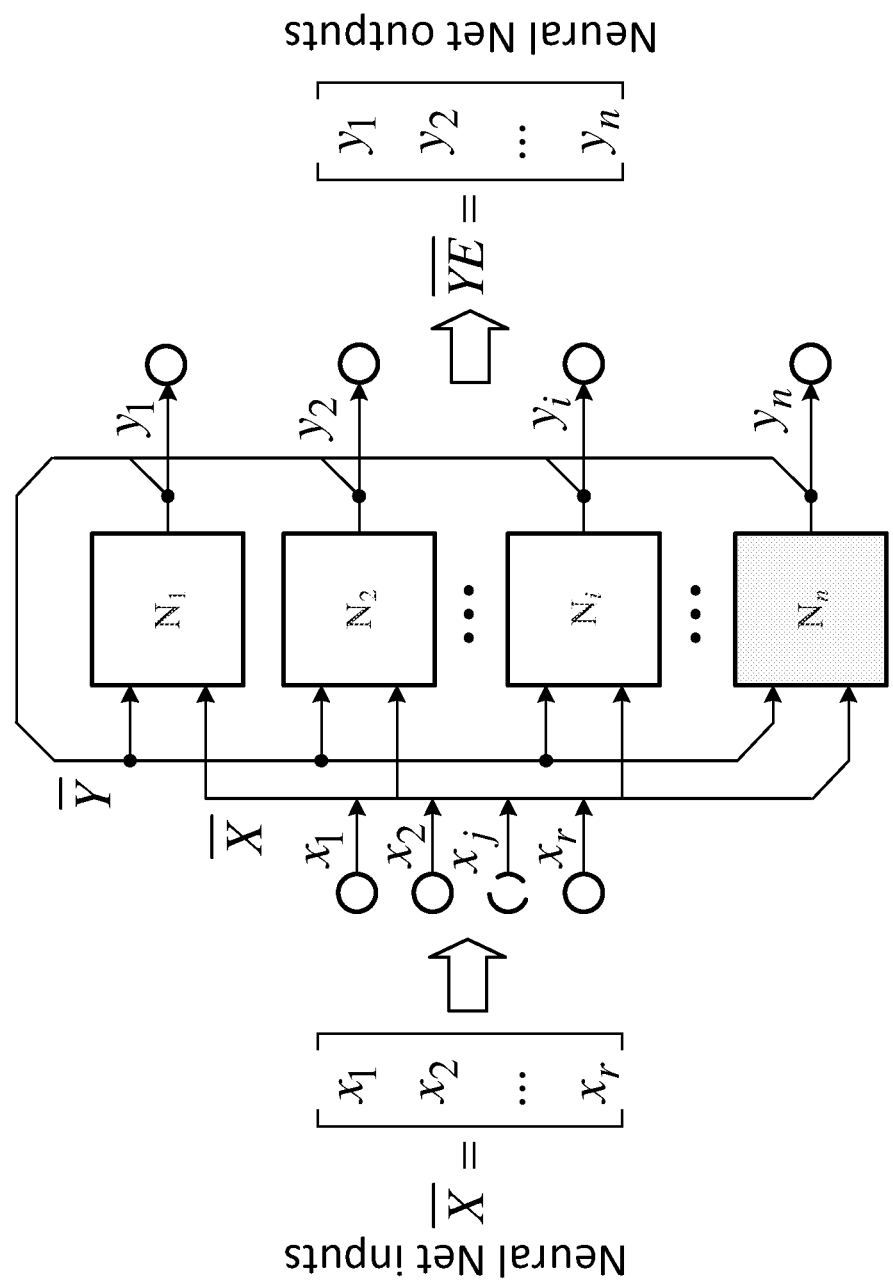
FIG. 4 shows the structure of a neural network during classification in the first training stage.

The proposed method for training and self-organization of a fully-connected recurrent neural network (on the example of a classification problem) is further defined by FIG. 4.

At the initial stage, the first neuron is added to the neural network; its output is connected to the first output of the network. Then, the network is trained in the same way as described above. At the stage, when another output with the highest discrepancy is determined, the next output is selected to be connected to the output of another added neuron, unless the number of neurons has reached the total number of outputs. FIG. 4 illustrates a situation after new neurons have been connected to all network outputs. The training is carried out using the GPU-adapted algorithm as described above.

Figure 5:
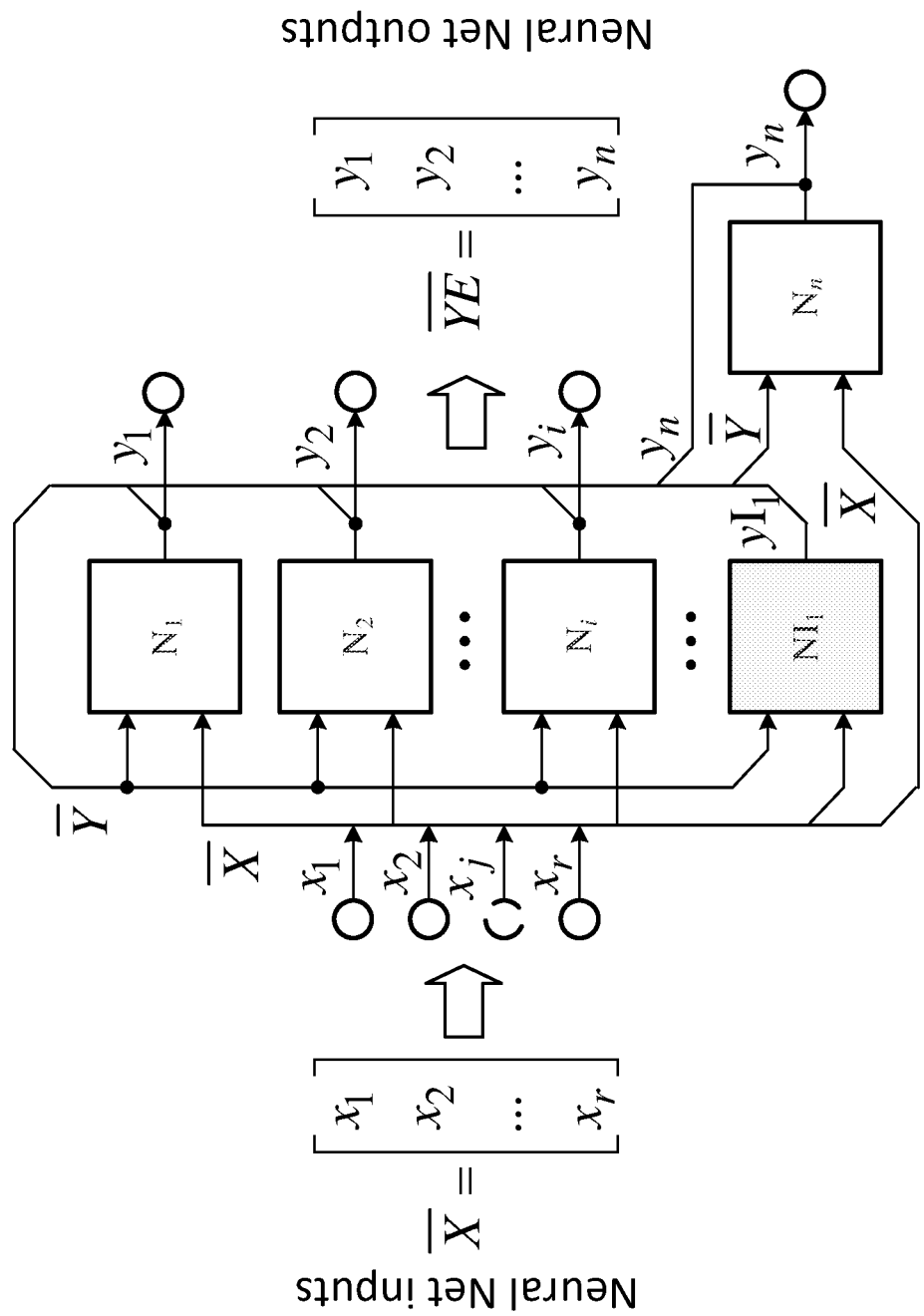
FIG. 5 shows the structure of a neural network during classification after the first additional neuron has been added.

After each network output has been connected to a neuron, the training is continued by locating a neuron with the highest discrepancy/error (e.g., an $n^{th}$ neuron, highlighted in FIG. 4). An additional neuron is added between the error neuron's output and the network output, with the added neuron's weights of connections to the neural network inputs and other neurons set to the same values as the error neuron's weights. In FIG. 5, the error neuron has been renamed as $NI_1$. Additional training is then carried out, while the neural network is upgraded, until the pre-set classification accuracy level is achieved.

Figure 6:
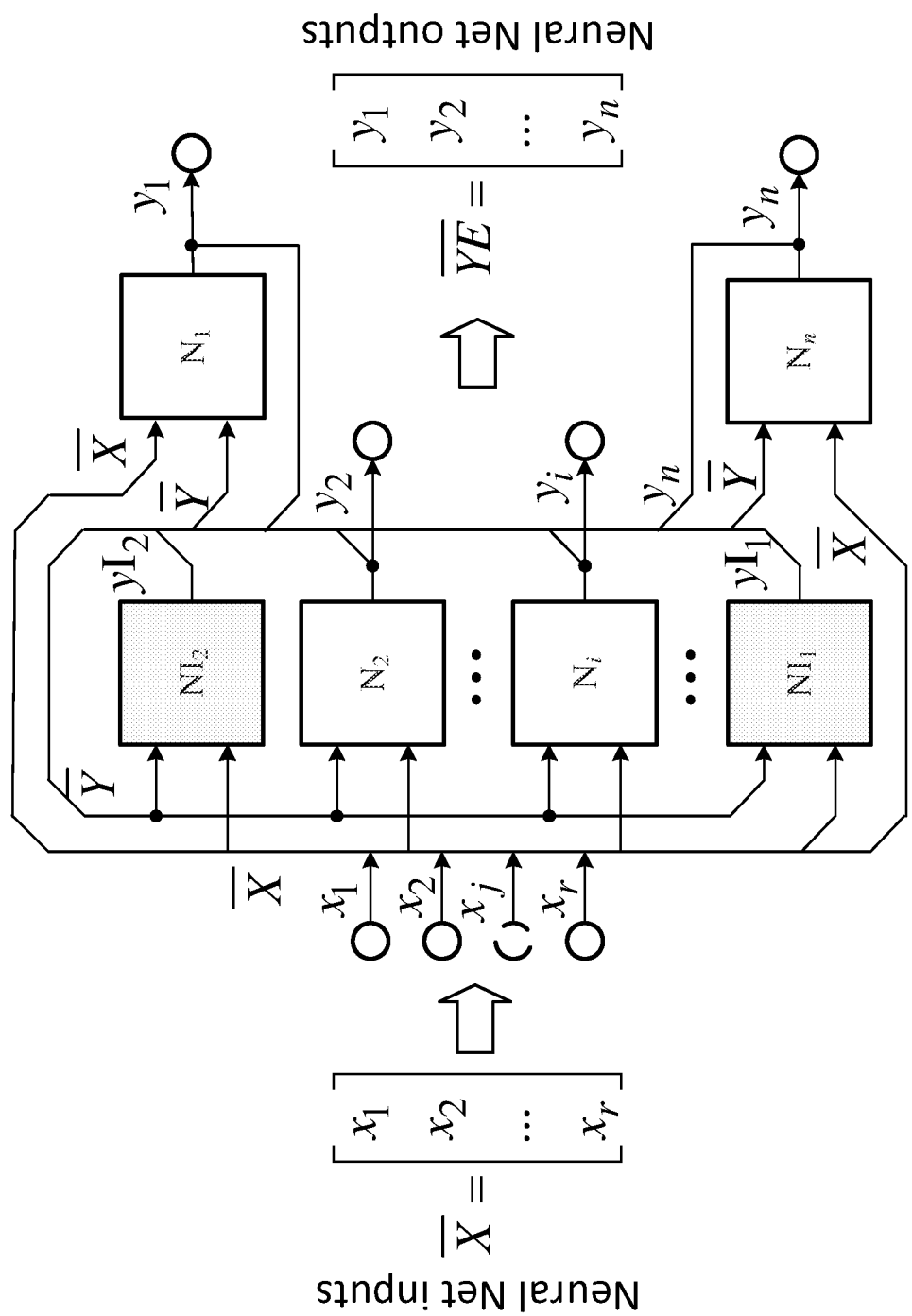
FIG. 6 shows the structure of a neural network during classification after the second additional neuron has been added.

The order of weight adjustments and preparation of training parameter tuples is the same as described above in the previous example. As soon as the training of the neural network (see FIG. 5) results in a model that is accurate enough, the training is stopped. Otherwise, a network output with the highest discrepancy is determined, and the training procedure is repeated (see FIG. 6). FIG. 6 illustrates a situation, when the highest error has been found at the first network output. Therefore, an additional neuron is connected to this first network output.

Figure 7:
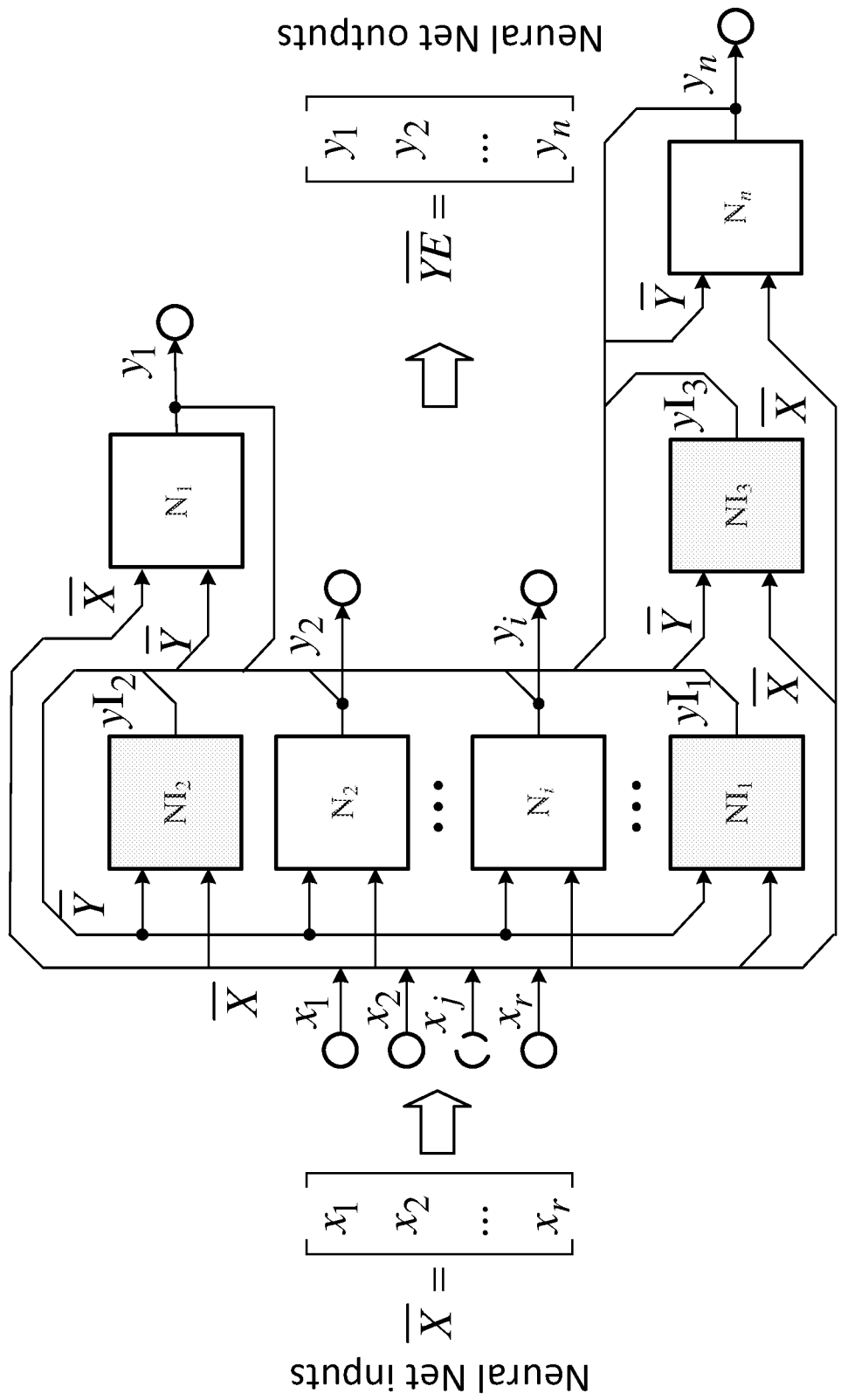
FIG. 7 shows the structure of a neural network during classification after the third additional neuron has been added.

If the highest error is found at the $n^{th}$ output again, then another additional neuron is added between this output and the determined neuron (FIG. 7). The training procedure is then repeated.

In this (i.e., yet another) cycle, the training follows the same procedure, where neuron weights and activation function parameters are adjusted based on the pre-set training depth. The training and neural network structure forming procedure follows the same algorithm until the model has achieved the pre-set accuracy level, or the given amount of time has expired.

Below are sample tasks that can be solved using the claimed invention:

Banks and insurance companies: automatic reading of checks or financial documents; signature validation; loan risk assessment; economic indicator change forecasting;

Administration: automatic document reading; automatic bar code recognition;

Oil and chemical industry: geological data analysis; equipment malfunction identification; mineral deposit discovery using air reconnaissance data; impurity composition analysis;

Military industry and aeronautics: sound signal processing (division, identification, localization); radar signal processing (target recognition, source identification and localization); infrared signal processing (localization); data synthesis; automated piloting;

Manufacturing: manipulator control; quality assessment; procedure monitoring; malfunction detection; adaptive robotics; voice control;

Security: face, voice, or fingerprint recognition;

Biomedical industry: X-ray image analysis; detection of deviations in electrocardiograms;

Telecommunications: adaptive network and communications control; image compression and recovery.

Example 1

Quality check for a binary classification is performed using the proposed method (named "Neuton" by the inventors) as compared to conventional machine learning methods and libraries (on the example of forecasting the number of the Titanic disaster survivors).

Operating Data

The training and model checking are carried out using the data on the passengers of the Titanic in the .CSV format. The target class for forecasting purposes is presented in the Survived column, where 1 means a person did survive, and 0 means a person did not. Additional descriptions for the dataset/task can be found in the corresponding competition details on the Kaggle website.

The dataset contains 1309 rows and 12 columns. The quality of the machine learning methods has been assessed using cross-validation without shuffling, dividing the entire dataset into five training sets and test samples, where 80% are training sets and 20% are test samples. Also, the resulting sampling sets have undergone additional processing (feature engineering) to achieve a better performance of machine learning methods, using conventional methods and algorithms, specifically:

1. The least meaningful columns have been deleted ("Name", "Ticket", "Cabin");

2. Missing "Age" and "Fare" data have been filled out with average values, while the "Embarked" data have been filled with the most frequent values;

3. Categorical features have been converted into numerical ones;

4. The "Embarked" feature has been converted using the one-hot encoding method. One-hot encoding is a representation of categorical variables as binary vectors. This first requires that the categorical values be mapped to integer values. Then, each integer value is represented as a binary vector that is all zero values except the index of the integer, which is marked with a 1;

5. The features have been normalized within the 0-1 range.

Comparison of Machine Learning Methods

Machine learning methods have been compared using indicators (metrics) listed below in Table 1 and Table 2.

TABLE 1

Classification Metrics

| Metric | Definition | Formula |
|---|---|---|
| Accuracy | The fraction or the count of correct predictions. | If $\hat{y}_i$ i is the predicted value of the i-th sample and $\hat{y}_i$ is the corresponding true value, then the fraction of correct predictions over $n_{samples}$ defined as $$\text{accuracy}(y, \hat{y}) = \frac{1}{n_{samples}} \sum_{i=0}^{n_{samples}-1} 1(\hat{y}_i = y_i)$$ |
| Accuracy | The ability of the classifier not to label as positive a sample that is negative | $\text{precision} = \dfrac{tp}{tp + fp}$<br>Where<br>tp - true positive, correct result,<br>fp - false positive, unexpected result |
| Recall | The ability of the classifier to find all the positive samples | $\text{recall} = \dfrac{tp}{fp + fn}$<br>Where<br>tp - true positive, correct result,<br>fn - false negative, missing result |
| $F_1$ | The F-measure ($F_\beta$ and $F_1$ measures) can be interpreted as a weighted harmonic mean of the accuracy and recall. An $F_\beta$ measure reaches its best value at 1 and its worst score at 0. With $\beta = 1$, $F_\beta$ and $F_1$ are equivalent, and the recall and the accuracy are equally important. | $F_\beta = 1 + \beta^2 \dfrac{\text{precision} \times \text{recall}}{\beta^2 \text{precision} + \text{recall}}$ |
| AUC | The area under the receiver operating characteristic (ROC) curve, which is also denoted by AUC or AUROC. By computing the area under the roc curve, the curve information is summarized in one number. | When using normalized units, the area under the curve (often referred to as simply the AUC) is equal to the probability that a classifier will rank a randomly chosen positive instance higher than a randomly chosen negative one (assuming 'positive' ranks higher than 'negative'). This can be seen as follows: the area under the curve is given by the integral boundaries are reversed as large T has a lower value on the x-axis) $$TPR(T) = \int_T^\infty f_1(x)dx;\ FPR(T) = \int_T^\infty f_0(x)dx;$$ $$A = \int_\infty^{-\infty} TPR(T)FPR'dT = \int_{-\infty}^\infty \int_{-\infty}^\infty I(T' > T)F_1(T')f_0(T)dT'dT = P(X_1 > X_0)$$ where $X_1$ is the score for a positive instance and $X_0$ is the score for a negative instance, and $f_0$ and $f_1$ are probability densities |
| GINI | The area between the receiver operating characteristic (ROC) curve and its diagonal | $AUC = \dfrac{(GINI + 1)}{2}$<br>$GINI = 2 * AUC - 1$ |

"Macro" metrics—the task is to calculate metrics for each label, and find their unweighted mean. This does not take label imbalance into account.

"Weighted" metrics—the task is to calculate metrics for each label, and find their average, weighted by support (the number of true instances for each label). This alters 'macro' to account for label imbalance; it can result in an F-score that is not between accuracy and recall.

TABLE 2

Regression Metrics

| Metric | Definition | Formula |
|---|---|---|
| MAE | Mean absolute error between observed and predicted values | If $\hat{y}_i$ is the predicted value of the i-th sample, and $\hat{y}_i$ is the corresponding true value, then the mean absolute error (MAE) estimated over $n_{samples}$ is defined as |

TABLE 2-continued

Regression Metrics

| Metric | Definition | Formula |
|---|---|---|
| | | $$MAE(y, \hat{y}) = \frac{1}{n_{samples}} \sum_{i=0}^{n_{samples}-1} |(y_i - \hat{y}_i)|$$ |
| RMSE | RMSE is the square root of the average of squared errors. The effect of each error on RMSE is proportional to the size of the squared error; thus larger errors have a disproportionately large effect on RMSE. Consequently, RMSE is sensitive to outliers. | The formula that defines the RMSE is: $$RMSE = \sqrt{\frac{\sum_{i=1}^{i=N}(\hat{y}_i - y_i)^2}{N-1}}$$ where $\hat{y}_i$ is the forecast value, $y_i$ the observed one, and N the number of observations. |
| RMSLE | Error between observed and predicted values (square root of squared average logarithmic error over all observations) | $$RMSLE = \frac{1}{N}\sqrt{\sum_{i=1}^{N}(\log(y_i+1) - \log(\hat{y}_i+1))^2}$$ where $\hat{y}_i$ is the forecast value, $y_i$ the observed one, and N the number of observations. |
| $R^2$ | The coefficient of determination. It provides a measure of how well future samples are likely to be predicted by the model. Best possible score is 1.0 and it can be negative (because the model can be arbitrarily worse). A constant model that always predicts the expected value of y, disregarding the in features, would get an $R^2$ score of 0.0. | If $\hat{y}_i$ is the predicted value of the i-th sample and $y_i$ is the corresponding true value, then the score $R^2$ estimated over $n_{samples}$ is defined as $$R^2(y, \hat{y}) = 1 - \frac{\sum_{i=o}^{n_{samples}-1}(y_i - \hat{y}_i)^2}{\sum_{i=0}^{n_{samples}-1}(y_i - \bar{y})^2}$$ where $\bar{y} = \sum_{i=0}^{n_{samples}-1} y_i$ |
| AE max | Maximum absolute error between observed and predicted values | AE max = MAX($|\hat{y}_i - y_i|$) where $\hat{y}_i$ is the forecast value, $y_i$ the observed one |
| AE min | Minimal absolute error between observed and predicted values | AE min = MIN($|\hat{y}_i - y_i|$) where $\hat{y}_i$ is the forecast value, $y_i$ the observed one |

"Accuracy" has been chosen to be the main target metric for the purposes of comparison. The weighted metrics for five datasets are listed in Table 3. The methods used are ranked according to their accuracy score, where the proposed method (Neuton) has been ranked the best. Its training time, as well as the numbers of neurons and coefficients resulting from the training using each of the five datasets, are listed in Table 4.

TABLE 3

| Method | Accuracy | AUC | F1 Macro | F1 Weighted | GINI | Accuracy macro | Accuracy weighted | Recall Macro | Recall Weighted |
|---|---|---|---|---|---|---|---|---|---|
| Neuton | 0.80362 | 0.81973 | 0.78267 | 0.79993 | 0.63946 | 0.79665 | 0.80200 | 0.77529 | 0.80362 |
| XGBoost | 0.78988 | 0.84008 | 0.76732 | 0.78598 | 0.68074 | 0.78184 | 0.7888 | 0.76042 | 0.78988 |
| Gradient Boosting | 0.77842 | 0.83869 | 0.75371 | 0.7738 | 0.67806 | 0.76873 | 0.77623 | 0.74676 | 0.77842 |
| Logistic Regression | 0.77537 | 0.82254 | 0.75369 | 0.77221 | 0.64502 | 0.76487 | 0.77465 | 0.74893 | 0.77537 |
| Keras Dense NN | 0.75248 | 0.81048 | 0.71187 | 0.73947 | 0.6209 | 0.74934 | 0.753 | 0.70567 | 0.75248 |
| Cat Boosting | 0.74863 | 0.81549 | 0.72763 | 0.74698 | 0.6309 | 0.73338 | 0.74838 | 0.7253 | 0.74863 |
| Random Forest | 0.73872 | 0.80021 | 0.71359 | 0.73533 | 0.60797 | 0.72159 | 0.73598 | 0.71008 | 0.73872 |
| Decision Tree | 0.728 | 0.71621 | 0.70628 | 0.72652 | 0.45464 | 0.71097 | 0.72836 | 0.70537 | 0.728 |

TABLE 4

| Number of experiment | Training time, min:sec | Number of neurons | Number of coefficients |
|---|---|---|---|
| 1 | 1:03 | 8 | 144 |
| 2 | 1:19 | 14 | 336 |
| 3 | 1:24 | 13 | 299 |
| 4 | 0:57 | 9 | 171 |
| 5 | 0:16 | 3 | 39 |

Example 2

Quality check for a multi-class classification using an artificial neural network that has been created and trained with the proposed method (Neuton) as compared to conventional machine learning methods and libraries (on the example of forecasting the ratings of schools in Dubai (UAE) for the 2015/2016 academic year).

Operating Data

The training and model checking are carried out using the data on 189 schools in the UAE in the .CSV format. The target class for forecasting purposes is presented in the 2015_2016 DCIB Rating column that may contain values ranging from 0 to 5. Also, the dataset contains school ratings from the past years (starting with 2010), along with the number of pupils who entered those schools in the given year, as well as school types and locations.

The dataset contains 189 rows and 17 columns. The quality of the machine learning methods has been assessed using cross-validation without shuffling, dividing the entire dataset into five training sets and test samples, where 80% are training sets and 20% are test samples.

Also, the resulting sampling sets have undergone additional processing (feature engineering) to achieve a better performance of machine learning methods, using conventional methods and algorithms, specifically:

1. The least meaningful column has been deleted ("School Name");
2. "Location" and "Type of school" have been divided into groups and put into separate columns;
3. Entries with missing target variables have been deleted;
4. Missing data in other columns have been filled out with nearest values in the group (within a row);
5. Groups of categorical features have been converted using the one-hot encoding method;
6. The features have been normalized within the 0.25-1 range;
7. Empty values have been set to 0.

Comparison of Machine Learning Methods

"Accuracy" has been chosen to be the main target metric for purposes of comparison. The weighted metrics for four datasets are listed in Table 5. Neuton's training time, as well as the numbers of neurons and coefficients resulting from the training using each of the four datasets, are listed in Table 6.

TABLE 6

| Number of experiment | Training time, min. | Number of neurons | Number of coefficients |
|---|---|---|---|
| 1 | 2:07 | 5 | 170 |
| 2 | 2:02 | 5 | 170 |
| 3 | 2:13 | 5 | 170 |
| 4 | 2:11 | 5 | 170 |

Thus, the proposed neural network that has been created and trained using the method described herein (Neuton) has demonstrated the best results.

Example 3

Quality check for a binary classification is performed using an artificial neural network that has been created and trained with the proposed method (Neuton) as compared to conventional machine learning methods and libraries (on the example of forecasting the probability of company's employees attrition).

Operating Data

The training and model checking are carried out using the data on 1470 company employees in the .CSV format. The target class for forecasting purposes is presented in the Attrition column that may contain Yes or No values. Also, the dataset contains data on education, department, the number of missions, the distance between home and office, salary, position, employee's satisfaction, etc.

The dataset contains 1470 rows and 31 columns. The quality of the machine learning methods has been assessed using cross-validation without shuffling, dividing the entire dataset into five training sets and test samples, where 70% are training sets and 30% are test samples.

Also, the resulting sampling sets have undergone additional processing (feature engineering) to achieve a better performance of machine learning methods, using conventional methods and algorithms, specifically:

1. Categorical variables have been converted into numerical format, either on a binary scale (0/1), or on a gradual scale (0/0.5/1);
2. Categorical features that have more than three degrees have been converted using the one-hot encoding method;
3. The features have been normalized within the 0-1 range.

Comparison of Machine Learning Methods

"ROC AUC" has been chosen to be the main target metric for purposes of comparison. The weighted metrics for five datasets are listed in Table 7. The proposed method (Neuton) has demonstrated the best results. Its training time, as well as the numbers of neurons and coefficients resulting from the training using each of the five datasets, are listed in Table 8.

TABLE 5

| Method | Accuracy | Accuracy Weighted | Recall Weighted | F1 Weighted | Accuracy Macro | Recall Macro | F1 Macro |
|---|---|---|---|---|---|---|---|
| XGB | 0.5917 | 0.5800 | 0.5920 | 0.5800 | 0.5020 | 0.4540 | 0.4720 |
| Logistic Regression | 0.4500 | 0.4280 | 0.4480 | 0.4080 | 0.3340 | 0.2660 | 0.2580 |
| Random Forest | 0.5542 | 0.5480 | 0.5540 | 0.5420 | 0.5120 | 0.4360 | 0.4560 |
| NN perceptron, params: 175 | 0.5375 | 0.4780 | 0.5380 | 0.4980 | 0.3440 | 0.3460 | 0.3340 |
| Neuton | 0.5958 | 0.5920 | 0.5960 | 0.5800 | 0.5520 | 0.4860 | 0.4920 |

TABLE 7

| Method | Accuracy avg | Recall avg | F1 avg | Accuracy | AUC | Gini normalized |
|---|---|---|---|---|---|---|
| XGB mig | 0.86 | 0.87 | 0.86 | 0.872 | 0.813 | 0.627 |
| XGB def | 0.86 | 0.87 | 0.85 | 0.871 | 0.818 | 0.636 |
| Catboost | 0.83 | 0.84 | 0.84 | 0.844 | 0.790 | 0.581 |
| Decision tr | 0.79 | 0.77 | 0.78 | 0.773 | 0.619 | 0.237 |
| Random F | 0.86 | 0.86 | 0.82 | 0.860 | 0.816 | 0.633 |
| Logistic Re | 0.86 | 0.87 | 0.86 | 0.872 | 0.839 | 0.677 |
| NN perceptron, params: 175 | 0.86 | 0.87 | 0.86 | 0.872 | 0.839 | 0.677 |
| Neutron | 0.87 | 0.88 | 0.87 | 0.877 | 0.841 | 0.682 |

TABLE 8

| Number of experiment | Training time, min:sec | Number of neurons | Number of coefficients |
|---|---|---|---|
| 1 | 2:30 | 2 | 100 |
| 2 | 2:46 | 3 | 153 |
| 3 | 2:27 | 2 | 100 |
| 4 | 2:44 | 3 | 153 |
| 5 | 2:49 | 3 | 153 |

Thus, the neural network that has been created and trained using the proposed method (Neuton) has demonstrated the best results based on the total of the indicators being assessed. Also, the number of neurons in the neural network thus created is much lower than in the networks that have been created and trained by other conventional methods.

Example 4

Quality check for a regression problem solution is performed using the Neuton artificial neural network as compared to conventional machine learning methods and libraries (on the example of forecasting the chemical composition of the air).

Operating Data

The training and model checking are carried out using the data obtained from a multi-sensor detector in the .CSV format. An hourly mean benzene concentration, $\mu g/m^3$ (reference analyzer) is the target variable for forecasting.

The dataset contains 9358 instances of hourly averaged responses from an array of 5 metal oxide chemical sensors embedded in an Air Quality Chemical Multisensor Device. The device was located on the field in a significantly polluted area, at road level, within an Italian city. Data were recorded from March 2004 to February 2005 (one year) representing the longest freely available recordings of on field deployed air quality chemical sensor devices' responses. Ground truth hourly averaged concentrations for CO, Non Metanic Hydrocarbons, Benzene, Total Nitrogen Oxides (NOx) and Nitrogen Dioxide (NO2) were provided by a co-located reference certified analyzer. Evidences of cross-sensitivities as well as both concept and sensor drifts are present as described in De Vito et al., Sens. And Act. B, Vol. 129, 2 (2008) eventually affecting sensors' concentration estimation capabilities. Missing values are tagged with a −200 value.

Attribute Information:
1. Date (DD/MM/YYYY)
2. Time (HH.MM.SS)
3. True hourly averaged concentration of CO in $mg/m^3$ (reference analyzer)
4. PT08.S1 (tin oxide) hourly averaged sensor response (nominally CO targeted)
5. True hourly averaged overall Non-Methanic Hydrocarbons concentration in $\mu g/m^3$ (reference analyzer)
6. True hourly averaged Benzene concentration in $\mu g/m^3$ (reference analyzer)
7. PT08.S2 (titania) hourly averaged sensor response (nominally NMHC targeted)
8. True hourly averaged NOx concentration in ppb (reference analyzer)
9. PT08.S3 (tungsten oxide) hourly averaged sensor response (nominally $NO_x$ targeted)
10. True hourly averaged NO2 concentration in $\mu g/m^3$ (reference analyzer)
11. PT08.S4 (tungsten oxide) hourly averaged sensor response (nominally $NO_2$ targeted)
12. PT08.S5 (indium oxide) hourly averaged sensor response (nominally $O_3$ targeted)
13. Temperature in ° C.
14. Relative Humidity (%)
15. AH Absolute Humidity The quality of the machine learning methods has been assessed using cross-validation without shuffling, dividing the entire dataset into five training sets and test samples, where 80% are training sets and 20% are test samples.

Also, the resulting sampling sets have undergone additional processing (feature engineering) to achieve a better performance of machine learning methods, using conventional methods and algorithms, specifically:
1. The least meaningful columns have been deleted ("Date", "Time", "Unnamed: 15", "Unnamed 16");
2. Missing data have been filled out with average values for each column;
3. The features have been normalized within the 0-1 range.

Comparison of Machine Learning Methods

"MAE" has been chosen to be the main target metric for the purposes of comparison. The weighted metrics for five datasets are listed in Table 1. The methods used are ranked according to their MAE score, where the proposed method (Neuton) has been ranked the best. Its training time, as well as the numbers of neurons and coefficients resulting from the training using each of the five datasets, are listed in Table 9.

TABLE 9

| | MAE | AE max | AE min | RMSE | R2 | RMSLE |
|---|---|---|---|---|---|---|
| Neuton | 0.00747 | 0.11011 | 0.0000017 | 0.01392 | 0.95834 | 0.01136 |
| Linear Regression | 0.01862 | 0.14246 | 0.0000114 | 0.02413 | 0.94812 | 0.02018 |
| Passive Aggressive Regressor | 0.02624 | 0.17998 | 0.0000311 | 0.03384 | 0.89894 | 0.02994 |
| Keras Dense NN | 0.03703 | 0.76774 | 0.0000006 | 0.04381 | 0.77019 | 0.03675 |

TABLE 10

| Number of experiment | Training time, min:sec | Number of neurons | Number of coefficients |
|---|---|---|---|
| 1 | 0:15 | 2 | 30 |
| 2 | 0:53 | 4 | 336 |
| 3 | 0:17 | 2 | 30 |
| 4 | 0:34 | 3 | 48 |
| 5 | 1:12 | 6 | 114 |

Figure 8:
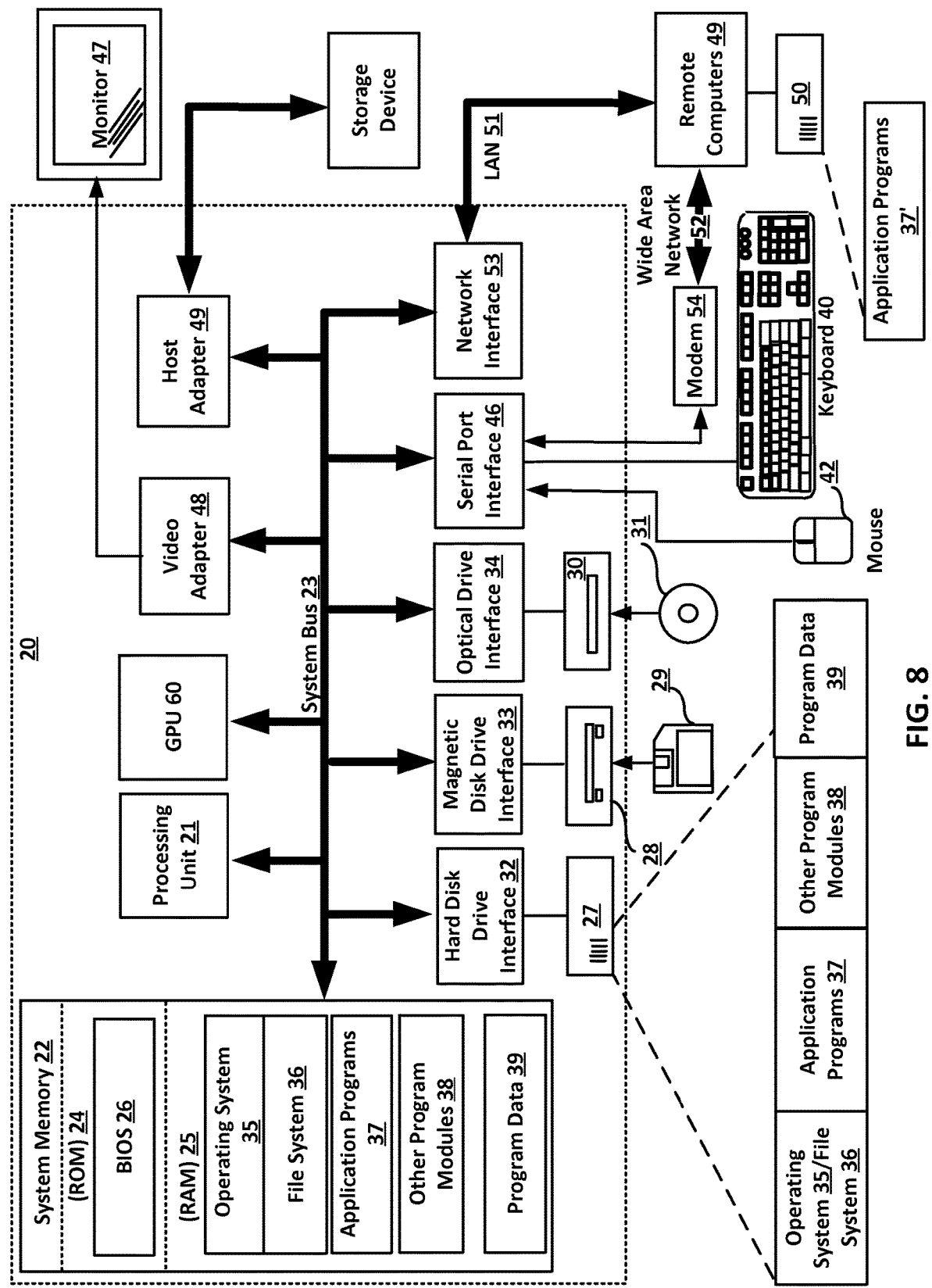
FIG. 8 shows an exemplary computer system that can be used to implement the invention.

With reference to FIG. 8, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT WINDOWS or LINUX). The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to a video adapter 48 that includes the GPU 60. The video adapter in dedicated graphic card solution is connected to the system bus 23 via an interface such as PCI or AGP or PCI interfaces controlled by a chipset of the motherboard. PCI (part of the PCI Local Bus standard and often shortened to PCI) is a computer bus for attaching hardware devices in a computer. These devices can take either the form of an integrated circuit fitted onto the motherboard itself, called a planar device in the PCI specification, or an expansion card that fits into a slot. The Accelerated Graphics Port (often shortened to AGP) is a high-speed point-to-point channel for attaching a video card to a computer's motherboard. PCI Express (Peripheral Component Interconnect Express), officially abbreviated as PCIe (or PCI-E, as it is commonly called), is a computer expansion card standard designed to replace the older PCI, PCI-X, and AGP standards. PCIe 2.1 is the latest standard for expansion cards that is available on mainstream personal computers. All of these can be used to interface to the GPU. Also, other types of GPU connection or coupling to the system bus may be used in the invention. For example, an integrated graphics solution may be used where integrated GPU utilizes a portion of a computer's system RAM rather than dedicated graphics memory over the system bus.

In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved.

REFERENCES

1. Yasushi et al., U.S. Pat. No. 5,033,006, "Self-extending neural-network" (1991).
2. Lee, U.S. Pat. No. 6,269,351, "Method and system of training of an artificial neural network" (2001).
3. Juyang et al., U.S. Pat. No. 9,424,514, "Synapse maintenance in the developmental networks" (2016).
4. Frank et al., U.S. Pat. No. 9,449,270, "Implementing structural plasticity in an artificial nervous system" (2016).

What is claimed is:

1. A method of training and self-organization of a neural network, comprising:
   receiving sets of digital attributes at inputs of the neural network, the neural network being adapted to perform multidimensional regression and comprising a plurality of neurons, each neuron being capable of being directly connected to any other neuron;
   randomly generating a training set and a testing set from an initial data set;
   generating a control data set that is not included in the training and testing sets;

defining a plurality of activation functions and interconnections of the neurons, each activation function being defined in terms of a plurality of activation function parameters;

defining a plurality of p model parameters of the neural network, the model parameters being divided into groups of η model parameters, wherein all η model parameters in each group are calculated in parallel at m points, and wherein at each of a plurality of q iterations of training a search interval for each model parameter in each group is reduced by up to twice a predefined discretization value $\Delta_q$, the discretization value being calculated according to the formula $$\Delta_q = \frac{2^{q-1} \text{interval}}{(m-1)^q},$$

where interval denotes a relative interval value;

training the neural network for at least one iteration;

responsive to a training speed of the neural network falling below a predefined threshold and a testing set model accuracy in a current iteration failing to improve for at least one of the groups of η model parameters, identifying a neuron having a highest error value out of a plurality of neurons connected to outputs of the neural network;

adding a neuron directly between the identified neuron and a corresponding output of the neural network and defining a connection coefficient between the added neuron and the corresponding output, such connection coefficient not being included among the η model parameters in the group being trained in the current iteration;

setting a pre-training connection coefficient between the added neuron and the identified neuron to zero and setting a plurality of pre-training connection coefficients between the added neuron and neurons other than the identified neuron to predetermined values;

training the neural network with the added neuron for at least one further iteration; and continuing to train the neural network until (1) a number of iterations exceeds a predefined threshold, (2) an error in the testing set model accuracy in the current iteration is less than a predefined value, or (3) the neural network reaches a predefined depth.

2. The method of claim 1, wherein once per iteration, a plurality of state vectors of a subset of the neurons are pre-computed, and the pre-computed state vectors are used to calculate state vectors of neurons other than the neurons whose state vectors are pre-computed.

3. The method of claim 1, further comprising the steps of:
at each iteration, training at least one of the groups of η model parameters using the training set;
at each iteration, after the at least one group of η model parameters has been trained, testing the neural network using the testing set and controlling the training of the at least one group of η model parameters using the control data set.

4. The method of claim 1, wherein the testing set model accuracy in the current iteration is increased relative to a previous iteration, the values of the activation function parameters are fixed, and training is continued for a next group of η model parameters, the next group selected out of p/η groups of model parameters of a single model parameter space.

5. The method of claim 1, further comprising setting an initial training depth, from the inputs of the neural network, and determining a number of neurons to be trained in the current iteration.

6. The method of claim 1, wherein the testing set model accuracy in the current iteration is not increased relative to a previous iteration, values of at least one of the groups of η model parameters are left equal to values of the at least one group of η model parameters from the previous iteration, and a new group of η model parameters is formed to continue the training.

7. A system for configuring a neural network for training and self-organization, the system comprising a memory containing computer-readable instructions and a processor to execute the computer-readable instructions to cause the system to:

receive sets of digital attributes at inputs of the neural network, the neural network being adapted to perform multidimensional regression and comprising a plurality of neurons, each neuron being capable of being directly connected to any other neuron;

randomly generate a training set and a testing set from an initial data set;

generate a control data set that is not included in the training and testing sets;

define a plurality of activation functions and interconnections of the neurons, each activation function being defined in terms of a plurality of activation function parameters;

define a plurality of p model parameters of the neural network, the model parameters being divided into groups of η model parameters, wherein all η model parameters in each group are calculated in parallel at m points, and wherein at each of a plurality of q iterations of training a search interval for each model parameter in each group is reduced by up to twice a predefined discretization value $\Delta_q$, the discretization value being calculated according to the formula $$\Delta_q = \frac{2^{q-1} \text{interval}}{(m-1)^q},$$

where interval denotes a relative interval value;

train the neural network for at least one iteration;

responsive to a training speed of the neural network falling below a predefined threshold and a testing set model accuracy in a current iteration failing to improve for at least one of the groups of model parameters, identify a neuron having a highest error value out of a plurality of neurons connected to outputs of the neural network;

add a neuron directly between the identified neuron and a corresponding output of the neural network and define a connection coefficient between the added neuron and the corresponding output, such connection coefficient not being included among the η model parameters in the group being trained in the current iteration;

set a pre-training connection coefficient between the added neuron and the identified neuron to zero and set a plurality of pre-training connection coefficients between the added neuron and neurons other than the identified neuron to predetermined values;

train the neural network with the added neuron for at least one further iteration; and continue to train the neural network until (1) a number of iterations exceeds a predefined threshold, (2) an error in the testing set model accuracy in the current iteration is less than a predefined value, or (3) the neural network reaches a predefined depth.

8. The system of claim 7, wherein once per iteration, a plurality of state vectors of a subset of the neurons are pre-computed, and the pre-computed state vectors are used to calculate state vectors of neurons other than the neurons whose state vectors are pre-computed.

9. The system of claim 7, wherein the memory further comprises computer-readable instructions that when executed cause the processor to:
- at each iteration, train at least one of the groups of $\eta$ model parameters using the training set; and
- at each iteration, after the at least one group of $\eta$ model parameters has been trained, test the neural network using the testing set and control the training of the at least one group of $\eta$ model parameters using the control data set.

10. The system of claim 7, wherein the testing set model accuracy in the current iteration is increased relative to a previous iteration, the values of the activation function parameters are fixed, and training is continued for a next group of $\eta$ model parameters, the next group selected out of $p/\eta$ groups of model parameters of a single model parameter space.

11. The system of claim 7, wherein the memory further comprises computer-readable instructions that when executed cause the processor to set an initial training depth, from the inputs of the neural network, and determine a number of neurons to be trained in the current iteration.

12. The system of claim 7, wherein the testing set model accuracy in the current iteration is not increased relative to a previous iteration, values of at least one of the groups of $\eta$ model parameters are left equal to values of the at least one group of $\eta$ model parameters from the previous iteration, and a new group of $\eta$ model parameters is formed to continue the training.

* * * * *